(12) United States Patent
Lin (10) Patent No.: US 9,429,784 B2
(45) Date of Patent: Aug. 30, 2016

(54) TOUCH DISPLAY PANEL AND TOUCH DISPLAY DEVICE USING THE SAME

(71) Applicant: INNOLUX CORPORATION, Miao-Li County (TW)

(72) Inventor: Ru-Ling Lin, Taichung (TW)

(73) Assignee: INNOLUX CORPORATION, Miao-Li County (TW)

( * ) Notice: Subject to any disclaimer, the term of this patent is extended or adjusted under 35 U.S.C. 154(b) by 165 days.

(21) Appl. No.: 14/064,125

(22) Filed: Oct. 26, 2013

(65) Prior Publication Data

US 2014/0125881 A1     May 8, 2014

(30) Foreign Application Priority Data

Nov. 2, 2012 (TW) .............................. 101140741 A (51) Int. Cl.
*G02F 1/1333* (2006.01)
*G06F 3/041* (2006.01)
*G06F 3/0488* (2013.01)
*G06F 3/044* (2006.01)

(52) U.S. Cl.
CPC ........... *G02F 1/13338* (2013.01); *G06F 3/044* (2013.01); *G06F 3/0412* (2013.01); *G06F 3/0488* (2013.01)

(58) Field of Classification Search
CPC ............. G02F 1/13338; G06F 3/0488; G06F 3/0412; G06F 3/044
See application file for complete search history.

(56) References Cited

U.S. PATENT DOCUMENTS

| 9,081,446 | B2 | 7/2015 | Liu et al. |
| 2008/0180400 | A1 | 7/2008 | Kim et al. |
| 2009/0174681 | A1 | 7/2009 | Chang et al. |
| 2009/0295692 | A1 | 12/2009 | Lee et al. |
| 2011/0267293 | A1* | 11/2011 | Noguchi et al. ............. 345/173 |

FOREIGN PATENT DOCUMENTS

CN     102023440 A     4/2011

* cited by examiner

*Primary Examiner* — Dung Nguyen
(74) *Attorney, Agent, or Firm* — Li & Cai Intellectual Property (USA) Office (57) ABSTRACT

A touch display panel includes a first substrate, a second substrate, a display layer, a plurality of scan electrodes, a plurality of data electrodes, a plurality of thin-film transistors, a plurality of driving electrodes and a plurality of sensing electrodes. The display layer is disposed between the first substrate and the second substrate. The scan electrodes and data electrodes are on the first substrate and cross each other. The thin-film transistors electrically connect to the scan electrodes and the data electrodes. The driving electrodes are disposed between the data electrodes and the second substrate, and overlapped the scan electrodes. The sensing electrodes are disposed on and overlapped the data electrodes. The data electrodes, the scan electrodes, the driving electrodes and the sensing electrodes are electrically insulated from each other. In addition, the value of the voltage input the touching drive electrodes are negative value.

10 Claims, 5 Drawing Sheets

TOUCH DISPLAY PANEL AND TOUCH DISPLAY DEVICE USING THE SAME

BACKGROUND

1. Technical Field

The invention relates to a display device and a display panel thereof, and in particular, to a touch display device and a touch display panel thereof.

2. Description of Related Art

With the technical development of the display panel with touch function (touch panel), the touch display panel is widely integrated to the electronic device. The in-cell touch display panel is the trend in particular. The characteristic of the touch display panel is the integration of the display panel circuit and the touch panel circuit. The combined routing allows displaying and touch controlling at the same time and is lighter as well as thinner. The touch panel circuit comprises the driving electrodes and the sensing electrodes. The material of both the driving electrodes and the sensing electrodes can be the transparent conductive material or the metallic material.

However, the resistance of the transparent conductive material is higher than the resistance of the metal material. As a result, the RC loading of the transparent conductive material is higher than that of the metal material. Thus, the size of the transparent conductive material is limited to smaller scale. On the other hand, the opaque metal material decreases the open ratio (aperture ratio) of the device. In order to decrease the impact of the metallic sensing electrodes and the metallic driving electrodes to the open ratio, the metallic sensing electrodes and the metallic driving electrodes are hidden above of the data electrodes or the scan electrodes for shadowing. The top of the data electrode refers to a viewing angle looking down to the data/scan electrodes.

In general, the driving electrodes generate a positive polarity voltage signal to form a touch induced capacitance with the sensing electrodes, so as to detect touch action. However, the backchannel of the thin-film transistor adjacent to the driving electrodes might be incorrect operation by the above-mentioned touch induced capacitance coupling effect. The incorrect operation results in the voltage disturbance of the pixel electrode, affects the accuracy of the output grayscale voltage of the pixel, and eventually causes poor display effect.

SUMMARY

The present invention provides a touch display panel, the touch display panel comprises a first substrate, a second substrate, a display layer, a plurality of scan electrodes, a plurality of data electrodes, a plurality of thin-film transistors, a plurality of driving electrodes and a plurality of sensing electrodes. The display layer is interposed between the first substrate and the second substrate. The scan electrodes and the data electrodes are interposed on the first substrate. The data electrodes cross the scan electrodes. The thin-film transistors electrically connect to the scan electrodes and the data electrodes. The driving electrodes are disposed between the data electrodes and the second substrate, and overlap with the scan electrodes. The sensing electrodes are disposed on and overlap with the data electrodes. The scan electrodes, the data electrodes, the driving electrodes and the sensing electrodes are electrically insulated from each other. In addition, the input voltage signal polarity of the driving electrodes is negative.

The present invention provides a touch display device, the touch display device comprises the above-mentioned touch display panel and a control device electrically connected to the touch display panel.

To sum up, the present invention provides a touch display panel and a touch display device. The driving electrodes of the touch display panel overlap the scan electrodes. The sensing electrodes of the touch display panel overlap the data electrodes. In addition, the driving electrodes and the sensing electrodes electrically insulate from each other. The input voltage signal polarity of the driving electrodes is negative. Thus, the impact of the pixel gray scale variation caused by the incorrect operation of the thin-film transistors is decreased.

In order to further appreciate the characteristic and technical contents of the present invention, references are hereunder made to the detailed descriptions and appended drawings in connection with the present invention. However, the appended drawings are merely shown for exemplary purpose rather than being used to restrict the scope of the present invention.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
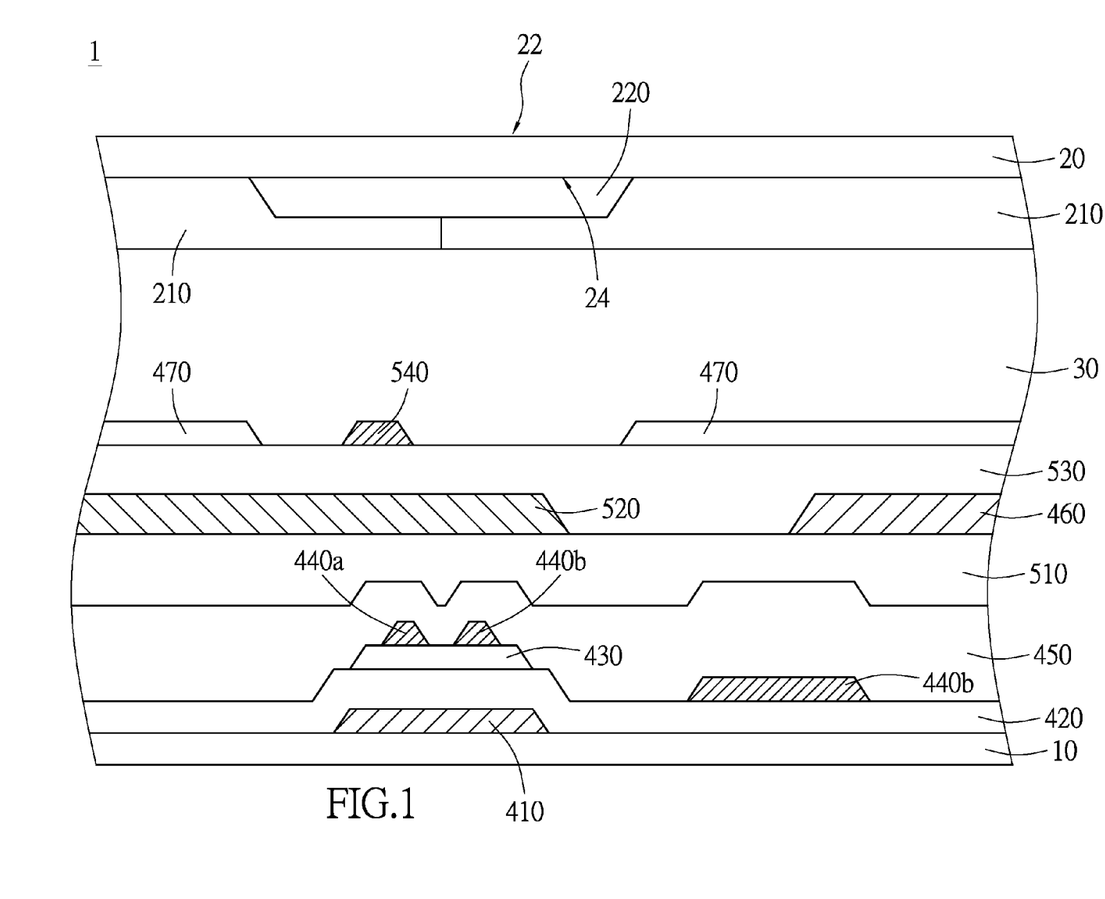
FIG. 1 is a cross-sectional view of the touch display panel in an embodiment of the present invention.
Figure 2:
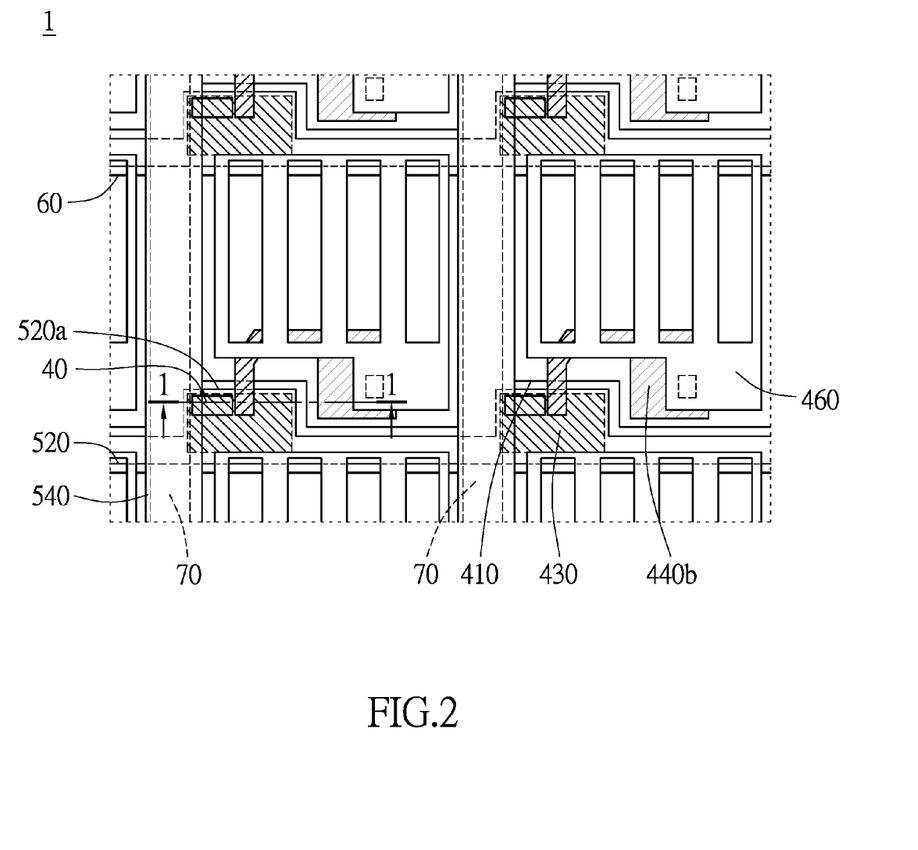
FIG. 2 is a top view of the touch display panel in an embodiment of the present invention.

FIG. 1 is a cross-sectional view of the touch display panel in an embodiment of the present invention. FIG. 2 is a top view of the touch display panel in an embodiment of the present invention. FIG. 1 is the cross-sectional view taken along line 1-1 in FIG. 2. Referring to FIG. 1 and FIG. 2, touch display panel 1 comprises a first substrate 10, a second substrate 20, a display layer 30, a plurality of thin-film transistors 40, a plurality of scan electrodes 60, a plurality of data electrodes 70, a plurality of driving electrodes 520, and a plurality of sensing electrodes 540. The scan electrodes 60 are arranged along a first axial direction, such as X-axis, abreast. The data electrodes 70 are arranged along a second axial direction, such as Y-axis, abreast. The driving electrodes 520 are arranged along the first axial direction abreast and overlap the scan electrodes 60. The sensing electrodes 540 are arranged along the second axial direction abreast and overlap the data electrodes 70.

The material of the first substrate 10 and the second substrate 20 can be glass, metal, plastic or other composition plate. The first substrate 10 is utilized to be the supporting structure to prevent the display layer 30 from the impact of moisture. The display layer 30 is a structure which affects polarization light, such as the liquid crystal structure, or the active matrix light emitting structure, such as the organic light emitting diode. The display layer 30 is concealed between the first substrate 10 and the second substrate 20 by the sealing material, such as sealant or frit.

A plurality of scan electrodes 60 is disposed on the first substrate 10 and interposed between the display layer 30 and on the first substrate 10. In addition, the scan electrodes 60 are arranged along the X-axis abreast. The distance between any two of the immediately adjacent scan electrodes 60 is substantially the same. Each of the scan electrodes 60 electrically connects to the corresponding scanning driver IC portion (not shown in the figure) respectively. The data electrodes 70 are disposed between the scan electrodes 60 and the display layer 30 and are arranged along the Y-axis abreast. The distance between any two of the immediately adjacent data electrodes 70 is substantially the same. Each of the data electrodes 70 electrically connects to the corresponding data driver IC portion respectively. The scan electrodes 60 and the data electrodes 70 are arranged electrically insulate to each other. The data electrodes 70 cross the scan electrodes 60. The data electrodes 70 are disposed closer to the display layer 30 than the scan electrodes 60.

The thin-film transistors 40 (bottom gate type) are disposed between the first substrate 10 and the display layer 30 to be the switching component and are arranged in a rectangular array matrix. That is to say, the thin-film transistors 40 are arranged along the X-axis and the Y-axis as a matrix. The scan electrodes 60 electrically connect to the gate electrode of the thin-film transistors 40. The data electrodes 70 electrically connect to the source electrode or the drain electrode of the thin-film transistors 40.

Specifically, each of bottom-gate thin-film transistors 40 in the present invention comprises a gate electrode 410, a gate insulating layer 420, a semiconductor layer 430, a source electrode 440a, a drain electrode 440b and a first insulating layer 450. The gate electrode 410 is formed on the first substrate 10 and coplanar with the scan electrodes 60. In other words the gate electrode 410 and the scan electrodes 60 are formed in the same step and electrically connect to each other. The gate insulating layer 420 is on top of the gate electrode 410 and the first substrate 10. The gate electrode 410 and the first substrate 10 are covered by the gate insulating layer 420, so as to electrically insulate with the scan electrodes 60 and the data electrodes 70. The semiconductor layer 430 is formed on top of the gate insulating layer 420 and corresponds to the disposed of the gate electrode 410. In addition, the area of the semiconductor layer 430 is smaller than the area of the gate electrode 410. The source electrode 440a and the drain electrode 440b are on two sides of the semiconductor layer 430 respectively and proximate to the ends of the gate electrode 410 as shown in FIG. 1. The source electrode 440a or the drain electrode 440b electrically connects to the data electrodes 70. The source electrode 440a and the drain electrode 440b defines an opening and expose the semiconductor layer 430 underneath. The exposing portion of the semiconductor layer 430 acts as a channel. The distance between the source electrode 440a and the drain electrode 440b is the length of the channel. The overlap distance of the source electrode 440a and the drain electrode 440b is the width of the channel. The first insulating layer 450 is atop of the source electrode 440a and the drain electrode 440b and covers the source electrode 440a, the drain electrode 440b and the semiconductor layer 430 underneath.

The material of the gate electrode 410, the source electrode 440a and the drain electrode 440b can be low resistance, conductive material, such as copper, aluminum, other metal, or alloy. The material of the gate insulating layer 420 can be SiNx, SiOx, or the combination thereof. The material of the semiconductor layer 430 can be the semiconductor material such as amorphous silicon, polysilicon, or IGZO. The material of the first insulating layer 450 can be SiNx, SiOx, resin, or polyimide. However, the present invention is not limited thereto.

Referring to FIG. 1 and FIG. 2, the planar layer 510 and the second insulating layer 530 are on the first insulating layer 450 in the present invention. A patterned first electrode 460 is disposed between the planar layer 510 and the second insulating layer 530. The patterned second electrode 470 is disposed between the display layer 30 and the second insulating layer 530. The first electrode 460 or the second electrode 470 electrically connect to the source electrode 440a or the drain electrode 440b by the extending contact via (not shown in figures), so as to from the pixel electrode. The other electrode electrically connects to the common voltage to from the common electrode. The material of the planar layer 510 and the second insulating layer 530 can be SiNx, SiOx, resin, organic polymer, or polyimide. The material of the first electrode 460 and the second electrode 470 can be the transparent ITO, transparent IZO or other transparent conductive materials.

While the touch display panel 1 is initialized, the scan electrodes 60 provide a voltage signal to the gate electrode 410, the absolute value of the voltage is greater than the threshold voltage of the thin-film transistors 40, so as to create a channel (turned on) in the semiconductor layer 430. The source electrode 440a and the drain electrode 440b then electrically connection activating. After that, the data electrodes 70 provide a pixel voltage signal to charge the first electrode 460 or the second electrode 470. Next, the voltage difference between the pixel electrode and the common electrode creates the fringe field, so as to alter the status of the display layer 30 to display the gray-scale picture.

It is worth noting that, in the present invention, the carrier of the semiconductor layer 430 is electron. Thus, polarity of the driving voltage of the scan electrodes 60 is a positive. Once the scan electrodes 60 provide a negative polarity voltage signal to the gate electrode 410, the channel will not be turned off, and the drain electrode 440b can not charge the first electrode 460. In addition, in the present invention, the input pixel voltage to the gate electrode 410 to form the channel is 22V, and the input pixel voltage to the gate electrode 410 to shut down the channel is −7V. However, the present invention is not limited to the input pixel voltage of the gate electrode 410.

Referring to FIG. 1 and FIG. 2, a plurality of driving electrodes 520 for touch function are arranged along X-axis abreast and are disposed between the planar layer 510 and the second insulating layer 530. The driving electrodes 520 overlap the scan electrodes 60 partially in the top view direction of the touch display panel 1. The width of the driving electrodes 520 are smaller than or equal to the width of the scan electrodes 60, so as to decrease the impact of the aperture ratio. A plurality of the sensing electrodes 540 for touch function is arranged along the Y-axis abreast and is disposed between the second insulating layer 530 and the display layer 30. The sensing electrodes 540 overlap the data electrodes 70 partially in the top view direction of the touch display panel 1. The width of the sensing electrodes 540 are smaller than or equal to the width of the data electrodes 70, so as to decrease the impact of the aperture ratio. In the present invention, the driving electrodes 520 are coplanar with the first electrode 460, and utilized the same material (such as ITO) and process with the first electrode 460. In other embodiment, the driving electrodes 520 are coplanar with the first electrode 460, and utilized different materials and processes with the first electrode 460. For example, the material of the driving electrodes 520 is metal, and the material of the first electrode 460 is ITO. On the other hand, the sensing electrodes 540 are coplanar with the second electrode 470, and utilized the same material (such as ITO) and process with the second electrode 470. On the other hand, the sensing electrodes 540 are coplanar with the second electrode 470, and utilized different materials and processes with the second electrode 470. For example, the material of the sensing electrodes 540 is metal, and the material of the second electrode 470 is ITO. The scan electrodes 60, the data electrodes 70, the driving electrodes 520 and the sensing electrodes 540 electrically insulate with each other. In addition, the driving signal of the scan electrodes 60, the data electrodes 70, the driving electrodes 520 and the sensing electrodes 540 are isolated with each other.

When the driving electrodes 520 input a driving voltage, the overlapping area of the driving electrodes 520 and the sensing electrodes 540 will form a capacitance matrix for detecting the touching action. While user's finger approaches or touches the capacitance matrix, the charge distribution of the capacitor electrode will change. In other words, the capacitance will change. The controller (not shown in figures), such as the microprocessor, will compute the touching position by the voltage change of the sensing electrodes 540.

When the driving electrodes 520 overlap the channel of the thin film transistor (semiconductor layer 430), the portion of driving electrodes 520 overlapping the semiconductor layer 430 acts as another gate electrode 410 (back gate). The voltage change of the driving electrodes 520 affect the conductive characteristic of the channel of the semiconductor layer 430. In the present embodiment, when the polarity of the input voltage signal of the gate electrode 410 is positive and greater than the threshold voltage, the channel of the thin-film transistors 40 will be turned on (misoperation). Then, the data electrodes 70 input incorrect data voltage signal to the first electrode 460 or the first electrode 460 leaks electrical current to the data electrodes 70. The phenomenon called backside channel effect (back channel effect). Hence, when the driving electrodes 520 partially overlap the channel of the semiconductor layer 430 and input a positive polarity input voltage signal higher than the threshold voltage, the channel of the thin-film transistors 40 turned on slightly. Then the inner pixel voltage generates a deviation to induce the distorted gray-scale. In addition, the voltage value, the thickness of the insulating layer, the dielectricity of the insulating layer, and the characteristic of the semiconductor layer 430 can also affect the channel performance of the thin-film transistors 40.

For example, the driving electrodes 520 completely superimpose the channel of the semiconductor layer 430 of the thin-film transistors 40. In addition, the thickness of the planar layer 510 is 2.5 mm and the thickness of the first insulating layer 450 is 0.2 mm. While the input voltage signal of the driving electrodes 520 changes to 5V and continues for about 4 μs, the voltage deviation of the first electrode 460 increases from 2.1V to 2.195V. That is to say, the voltage deviation of the first electrode 460 is about 95 mV. The voltage deviation causes 2-3 degree difference in a 6 bits, gray scale display device (one degree difference is about 40 mV). The voltage deviation causes 9-10 degree difference in a 8 bits, gray scale display device (one degree difference is about 10 mV). In general, the voltage deviation more than to 40 mV can be distinctively observed by the observer. The voltage deviation between 10 mV to 40 mV may be observed, depending on different viewers. The voltage deviation between 0 mV to 10 mV can hardly be observed. Thus, one of the embodiments in the present invention decreases the voltage deviation falling into the range of 0 to 40 mV.

Figure 2A:
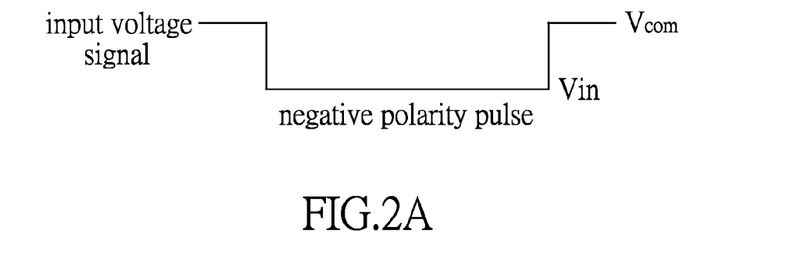
FIG. 2A shows a waveform of the input voltage signal provided to the driving electrodes in an embodiment of the present invention.

When polarity of the input voltage signal (Vin) of the driving electrodes 520 relative to the common voltage (Vcom) is negative, as shown in FIG. 2A, or smaller than the threshold voltage of the thin-film transistors 40, it ensures the channel of the thin-film transistors 40 being turned off, and the original data voltage of the first electrode 460 is maintained. The value of the negative voltage can be in the range of −1V to −40V. In the preferred embodiment, the value of the negative input voltage signal can be in the range of −5V to −20V. However, the present invention is not limited to the input voltage value of the electrode section 520a. In other embodiment, the negative input voltage signal can be in the range of −1V to −40V.

Referring to the FIG. 1, the touch display panel 1 further comprises a color filter 210 and a black matrix 220. The color filter 210 is disposed between the second substrate 20 and the display layer 30. The black matrix 220 is disposed between the color filter 210 and the second substrate 20. The black matrix 220 can be replaced by the overlapped color filters 210. The black matrix 220 is utilized to shield the scan electrodes 60, data electrodes 70, driving electrodes 520 and sensing electrodes 540, which are disposed underneath the black matrix 220. Thus, the width of the black matrix 220 is greater than the above mentioned electrodes. Moreover, in the present embodiment horizontal electric field is employed in the display device, such as fringe field switching (FFS). The voltage deviation between the first electrode 460 and the second electrode 470 is equivalent to the voltage deviation between data voltage and common voltage. The voltage deviation generates an electric field to rotate the liquid crystal molecules of the display layer 30.

In addition, in other embodiment, other display technology can also be utilized, such as in plane switching (IPS). It is worth noting that, in present embodiment, the driving electrodes 520 are disposed between the planar layer 510 and the second insulating layer 530 and coplanar with the first electrode 460. The sensing electrodes 540 are disposed between the second insulating layer 530 and the display layer 30 and coplanar with the second electrode 470. However, the present invention is not limited to the location of the driving electrodes 520 and the sensing electrodes 540. The driving electrodes 520 can be coplanar with and electrically insulating to the scan electrodes 60 or the data electrodes 70. The driving electrodes 520 can also be coplanar with and electrically insulating to the second electrode 470. The sensing electrodes 540 can be coplanar with and electrically insulated to the data electrodes 70 or the first electrode 460. The sensing electrodes 540 can also be disposed between the color filter 210 and the black matrix 220 or between the color filter 210 and the display layer 30. The sensing electrodes 540 can also be disposed on the second substrate 20 facing the display layer 30.

Figure 3:
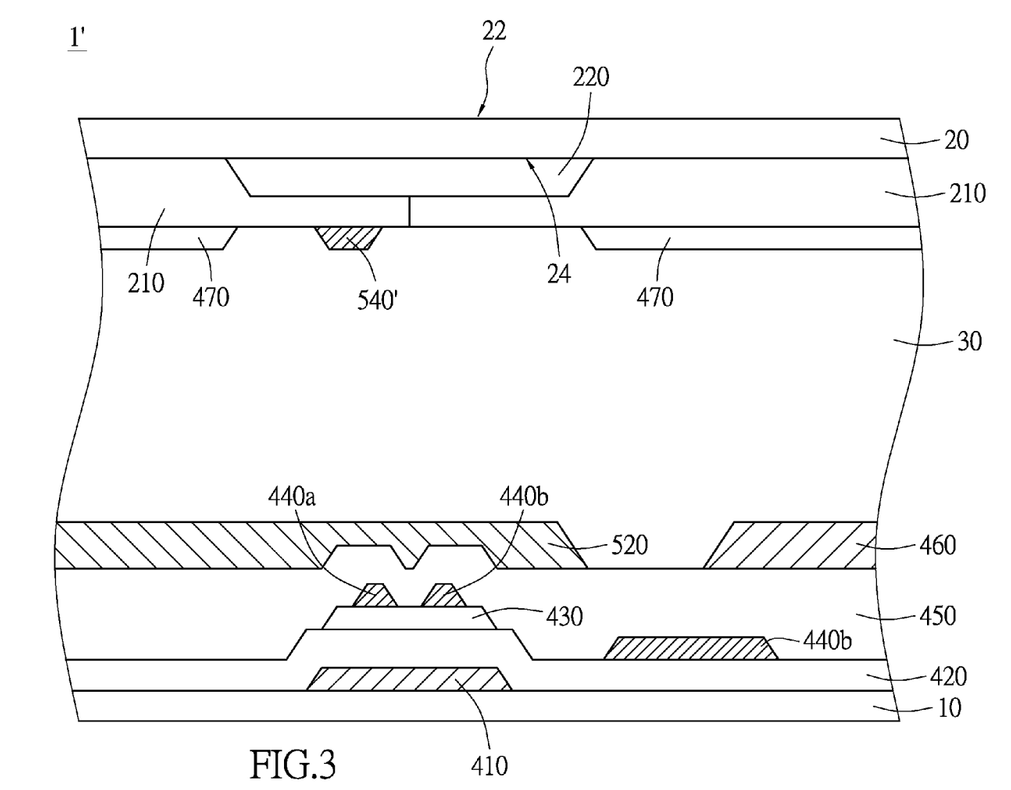
FIG. 3 is a cross-sectional view of the touch display panel in another embodiment of the present invention.

FIG. 3 is the cross-sectional view of the touch display panel 1' in another embodiment of the present invention. Referring to FIG. 3, in this embodiment, the structure of the touch display panel 1' is the same as the abovementioned embodiment in general. The touch display panel 1' employs vertical alignment in the present invention. The second electrode 470 of touch display panel 1' is disposed between the display layer 30 and the color filter 210. The sensing electrodes 540 are coplanar with and electrically insulating to the second electrode 470. The planar layer 510 and the second insulating layer 530 are absent between the data electrodes 70 and the display layer 30. The driving electrodes 520 are coplanar with and electrically insulating to the first electrode 460.

Figure 4:
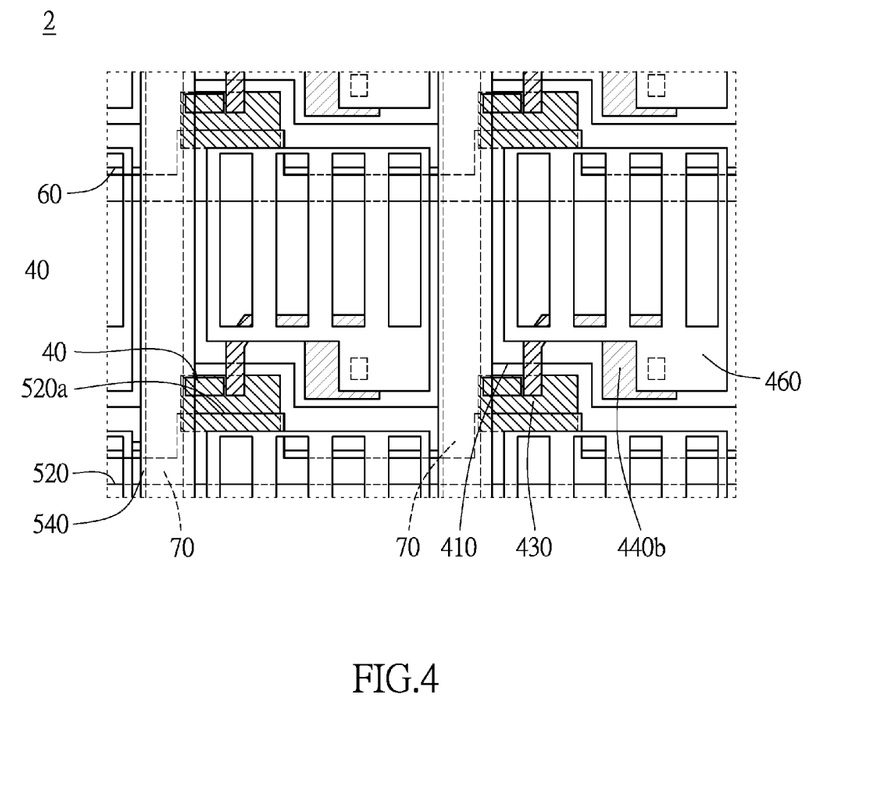
FIG. 4 is a top view of the touch display panel in another embodiment of the present invention.

FIG. 4 is a top view of the touch display panel 2 in another embodiment of the present invention. Referring to FIG. 4, the structure of the touch display panel 2 is the same as the touch display panel 1 in the abovementioned embodiment in general. The same technical features are omitted herein to avoid repetition. Nevertheless, compared to the touch display panel 1 in the abovementioned embodiment, only ⅓ of the channel area of the semiconductor layer 430 is overlapped by the electrode zone 520a of the driving electrodes 520. The voltage of the first electrode 460 is 38.73 mV, smaller than 40 mV in this embodiment. In other words, the voltage deviation of the gray scale caused by the voltage deviation cannot be observed by the observer easily.

The touch display panel 1 combined with the control device (not shown in the figure) or backlight module (not shown in the figure) can be implemented to various kinds of touch control device. The control device includes a mother board, an image chip, a central processor or several passive components. The control device controls the operation of the touch display panel 1, outputs power to the backlight module, and inputs image signal to the image chip. The touch display device can be a liquid crystal display screen of a desktop computer, a screen of a laptop, a liquid crystal television and a screen of a hand-held electronic device. The above-mentioned hand-held electronic device can be mobile phone, digital camera, digital video camera, game consoles, or personal digital assistant (PDA).

To sum up, the present invention provides a touch display panel. The touch display panel comprises the first substrate, the second substrate, the display layer, the plurality of thin-film transistors, the plurality of scan electrodes, the plurality of data electrodes, the plurality of sensing electrodes and the plurality of driving electrodes. The scan electrodes are arranged along X-axis abreast. The data electrodes are arranged along Y-axis abreast. The above-mentioned electrodes electrically insulate from each other. A negative voltage is input to the driving electrodes in the present invention, so as to decrease the change of gray scale caused by the incorrect operation of the channel of the thin-film transistors. Moreover, the area of the semiconductor layer shielded by the driving electrodes can be changed to control the voltage deviation of the channel of the thin-film transistors in the range of 0 to 40 mV. Thus, the distortion of gray scale of the touch display panel can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A touch display panel comprising:
a first substrate;
a second substrate;
a display layer interposed between the first substrate and the second substrate;
a plurality of scan electrodes interposed between the first substrate and the display layer;
a plurality of data electrodes interposed between the scan electrodes and the display layer, and the data electrodes cross the scan electrodes;
a plurality of thin-film transistors, each of the thin-film transistors electrically connected to one of the scan electrodes and one of the data electrodes, wherein the thin-film transistors comprise:
 a gate electrode disposed on the first substrate;
 a gate insulating layer covering the gate electrode and the first substrate;
 a semiconductor layer disposed on the gate insulating layer corresponding to the gate electrode;
 a source electrode disposed on one side of the semiconductor layer;
 a drain electrode disposed on the other side, opposed to the source electrode, of the semiconductor layer; and
 a first insulating layer covering the drain electrode, the source electrode, and the semiconductor layer;
 wherein a channel of the semiconductor layer is formed between the source electrode and the drain electrode;
a plurality of driving electrodes, disposed between the data electrodes and the second substrate, superimposing on the scan electrodes, wherein the driving electrodes overlap the channel and an overlapping portion is at the range from 0 to full area of the channel;
a plurality of sensing electrodes disposed between the data electrodes and the second substrate, superimposing on the data electrodes;
wherein the scan electrodes, the data electrodes, the driving electrodes and the sensing electrodes are electrically insulated, and the polarity of driving signals of the driving electrodes are negative;
a second insulating layer disposed on the first insulating layer;
a planar layer disposed between the first insulating layer and the second insulating layer;
a first electrode disposed between the planar layer and the second insulating layer; and
a second electrode disposed between the second insulating layer and the display layer;
wherein the drain electrode electrically is connected to the first electrode or the second electrode selectively.

2. The touch display panel of claim 1, wherein the driving electrodes are coplanar with the first electrode and the sensing electrodes are coplanar with the second electrode.

3. The touch display panel of claim 1, wherein while applying driving signals to the driving electrodes, a voltage deviation range of the first electrode or the second electrode is between 0 to 40 mV.

4. The touch display panel of claim 1, wherein the material of the driving electrodes is metal.

5. A touch display panel comprising:
a first substrate;
a second substrate;
a display layer interposed between the first substrate and the second substrate;
a plurality of scan electrodes interposed between the first substrate and the display layer;
a plurality of data electrodes interposed between the scan electrodes and the display layer, and the data electrodes cross the scan electrodes;
a plurality of thin-film transistors, each of the thin-film transistors electrically connected to one of the scan electrodes and one of the data electrodes, wherein the thin-film transistors comprise:
 a gate electrode disposed on the first substrate;

a gate insulating layer covering the gate electrode and the first substrate;
a semiconductor layer disposed on the gate insulating layer corresponding to the gate electrode;
a source electrode disposed on one side of the semiconductor layer;
a drain electrode disposed on the other side, opposed to the source electrode, of the semiconductor layer; and
a first insulating layer covering the drain electrode, the source electrode, and the semiconductor layer;
wherein a channel of the semiconductor layer is formed between the source electrode and the drain electrode;
a plurality of driving electrodes, disposed between the data electrodes and the second substrate, superimposing on the scan electrodes, wherein the driving electrodes overlap the channel and an overlapping portion is at the range from 0 to full area of the channel;
a plurality of sensing electrodes disposed between the data electrodes and the second substrate, superimposing on the data electrodes;
wherein the scan electrodes, the data electrodes, the driving electrodes and the sensing electrodes are electrically insulated, and the polarity of driving signals of the driving electrodes are negative;
a second insulating layer disposed on the first insulating layer;
a first electrode disposed between the display layer and the first insulating layer; and
a second electrode disposed between the display layer and the second substrate;
wherein the first electrode electrically connects to the drain electrode.

6. The touch display panel of claim 5, wherein the driving electrodes are coplanar with the first electrode and the sensing electrodes are coplanar with the second electrode.

7. The touch display panel of claim 5, wherein while applying driving signals to the driving electrodes, a voltage deviation range of the first electrode or the second electrode is between 0 to 40 mV.

8. The touch display panel of claim 5, wherein the material of the driving electrodes is metal.

9. A touch display device comprising:
a touch display panel comprising:
    a first substrate;
    a second substrate;
    a display layer interposed between the first substrate and the second substrate;
    a plurality of scan electrodes interposed between the first substrate and the display layer;
    a plurality of data electrodes interposed between the scan electrodes and the display layer, and the data electrodes cross the scan electrodes;
    a plurality of thin-film transistors, each of the thin-film transistors electrically connected to one of the scan electrodes and one of the data electrodes, wherein the thin-film transistors comprise:
        a gate electrode disposed on the first substrate;
        a gate insulating layer covering the gate electrode and the first substrate;
        a semiconductor layer disposed on the gate insulating layer corresponding to the gate electrode;
        a source electrode disposed on one side of the semiconductor layer;
        a drain electrode disposed on the other side, opposed to the source electrode, of the semiconductor layer; and
        a first insulating layer covering the drain electrode, the source electrode, and the semiconductor layer;
        wherein a channel of the semiconductor layer is formed between the source electrode and the drain electrode;
    a plurality of driving electrodes, disposed between the data electrodes and the second substrate, superimposing on the scan electrodes, wherein the driving electrodes overlap the channel and an overlapping portion is at the range from 0 to full area of the channel;
    a plurality of sensing electrodes disposed between the data electrodes and the second substrate, superimposing on the data electrodes;
    wherein the scan electrodes, the data electrodes, the driving electrodes and the sensing electrodes are electrically insulated, and the polarity of driving signals of the driving electrodes are negative;
    a second insulating layer disposed on the first insulating layer;
    a planar layer disposed between the first insulating layer and the second insulating layer;
    a first electrode disposed between the planar layer and the second insulating layer; and
    a second electrode disposed between the second insulating layer and the display layer;
    wherein the drain electrode electrically is connected to the first electrode or the second electrode selectively.

10. The touch display device of claim 9, further comprising a control unit electrically connected to the touch display panel.

* * * * *